US012311921B2

(12) United States Patent
Kim et al.

(10) Patent No.: US 12,311,921 B2
(45) Date of Patent: May 27, 2025

(54) METHOD FOR JOINT PARKING AND SYSTEM THEREFOR

(71) Applicant: HYUNDAI MOBIS CO., LTD., Seoul (KR)

(72) Inventors: Seung Jae Kim, Hwaseong-si (KR); Kyung Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 306 days.

(21) Appl. No.: 18/066,334

(22) Filed: Dec. 15, 2022

(65) Prior Publication Data

US 2023/0234562 A1 Jul. 27, 2023

(30) Foreign Application Priority Data

Jan. 21, 2022 (KR) .................. 10-2022-0008975

(51) Int. Cl.
| | |
|---|---|
| *B60W 30/06* | (2006.01) |
| *B60W 50/14* | (2020.01) |
| *G08G 1/00* | (2006.01) |
| *G08G 1/0967* | (2006.01) |
| *G08G 1/14* | (2006.01) |
| *G08G 1/16* | (2006.01) |
| *H04W 4/46* | (2018.01) |
| *H04W 4/80* | (2018.01) |

(52) U.S. Cl.
CPC ............ *B60W 30/06* (2013.01); *B60W 50/14* (2013.01); *G08G 1/096725* (2013.01); *G08G 1/143* (2013.01); *G08G 1/161* (2013.01); *G08G 1/202* (2013.01); *H04W 4/46* (2018.02); *H04W 4/80* (2018.02); *B60W 2050/146* (2013.01); *B60W 2556/65* (2020.02)

(58) Field of Classification Search
CPC ................. B60W 30/06; B60W 50/14; B60W 2050/146; B60W 2556/65; B60W 30/08; B60W 60/001; G08G 1/096725; G08G 1/143; G08G 1/161; G08G 1/202; G08G 1/096741; G08G 1/096791; G08G 1/22; G08G 1/168; H04W 4/46; H04W 4/80
See application file for complete search history.

(56) References Cited

U.S. PATENT DOCUMENTS

2017/0118307 A1* 4/2017 Beaurepaire ............ H04W 4/40

* cited by examiner

*Primary Examiner* — Daryl C Pope
(74) *Attorney, Agent, or Firm* — NovoTechIP International PLLC

(57) ABSTRACT

Disclosed is a method for joint parking, the method including selecting a number of target vehicles participating in the joint parking by a reference vehicle, generating joint parking information based on the selected number of the joint parking vehicles by the reference vehicle, transmitting the generated joint parking information to the target vehicle, and controlling the joint parking to be performed based on the joint parking information.

16 Claims, 8 Drawing Sheets

METHOD FOR JOINT PARKING AND SYSTEM THEREFOR

CROSS-REFERENCE TO RELATED APPLICATIONS

Pursuant to 35 U.S.C. § 119(a), this application claims the benefit of earlier filing date and right of priority to Korean Application No. 10-2022-0008975, filed on Jan. 21, 2022, the contents of which are hereby incorporated by reference herein in their entirety.

TECHNICAL FIELD

The present disclosure relates to a joint parking method and system, and more specifically, to a method for joint parking and system therefor with a function in which multiple vehicles perform joint parking while being provided with parking information by a reference vehicle.

BACKGROUND

Recently, with the emergence of a parking facility management system using various types of sensors, various management systems for standardized parking facilities are being prepared and developed.

However, although related parking systems have smooth supply of power and maximized efficiency in systematic parking facilities, there is a problem that the related art parking system is not applicable outdoors.

To solve this problem, a reference vehicle herein provides parking information and another vehicle receives the guidelines and provides a function to park, thus providing joint parking technology that allows multiple vehicles to park appropriately for a particular situation.

SUMMARY

Accordingly, embodiments of the present disclosure are directed to a method and system for joint parking that substantially obviate one or more problems due to limitations and disadvantages of the related art.

To solve the above problems, one object of the present disclosure is to provide a joint parking method and system of providing a guideline for joint parking in a manner of providing parking information by a reference vehicle and providing a function of parking by another vehicle that receives the corresponding guideline.

Technical tasks obtainable from the present disclosure are non-limited by the above-mentioned technical tasks. Additionally, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages, in one technical aspect of the present disclosure, provided is a method for joint parking, the method including selecting a number of target vehicles participating in the joint parking by a reference vehicle, generating joint parking information based on the selected number of the joint parking vehicles by the reference vehicle, transmitting the generated joint parking information to the target vehicle, and controlling the joint parking to be performed based on the joint parking information.

The generating the joint parking information may include checking parking arrangement according to the selected number of the joint parking vehicles and generating the joint parking information including surrounding obstacle information centering on the reference vehicle and parking position information of the target vehicle based on the parking arrangement.

The transmitting the generated joint parking information to the target vehicle, may include determining whether a communication state with the target vehicle participating in the joint parking is an online state or an offline state and transmitting the joint parking information based on the determined communication state.

The transmitting the joint parking information based on the determined communication state may include transmitting the joint parking information to the target vehicle performing the joint parking simultaneously through V2V (vehicle-to-vehicle) communication based on the communication state that is the online state.

The transmitting the joint parking information based on the determined communication state may include transmitting the joint parking information to the target vehicle performing the joint parking through short range communication on one to one based on the communication state that is the offline state.

The controlling the joint parking to be performed based on the joint parking information may include displaying the joint parking information on an in-vehicle display by each vehicle in the joint parking.

The displaying the joint parking information on the in-vehicle display by each vehicle in the joint parking may include displaying at least one of an AVM parking guide or a rear camera parking guide on the in-vehicle display.

Based on the AVM parking guide displayed on the in-vehicle display, a target parking area, a parking target center, a wheel direction guide, and a parking effective area may be displayed within an AVM of each vehicle.

Based on the rear camera parking guide displayed on the in-vehicle display, a target parking area, a parking target center, a current wheel direction, a wheel direction guide, and a parking effective area may be displayed within a rear camera image of the each vehicle.

Accordingly, the present disclosure provides various effects and/or advantages.

According to embodiments of the present disclosure, a joint parking system may create a personal space through a plurality of vehicles, thereby playing a role as a safety area as well as providing privacy protection.

Effects obtainable from the present disclosure may be non-limited by the above-mentioned effect. In addition, other unmentioned effects can be clearly understood from the following description by those having ordinary skill in the technical field to which the present disclosure pertains. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the disclosure, when a part "includes" a certain component, this means that it may further include other components, rather than excluding other components, unless otherwise stated.

Figure 1:
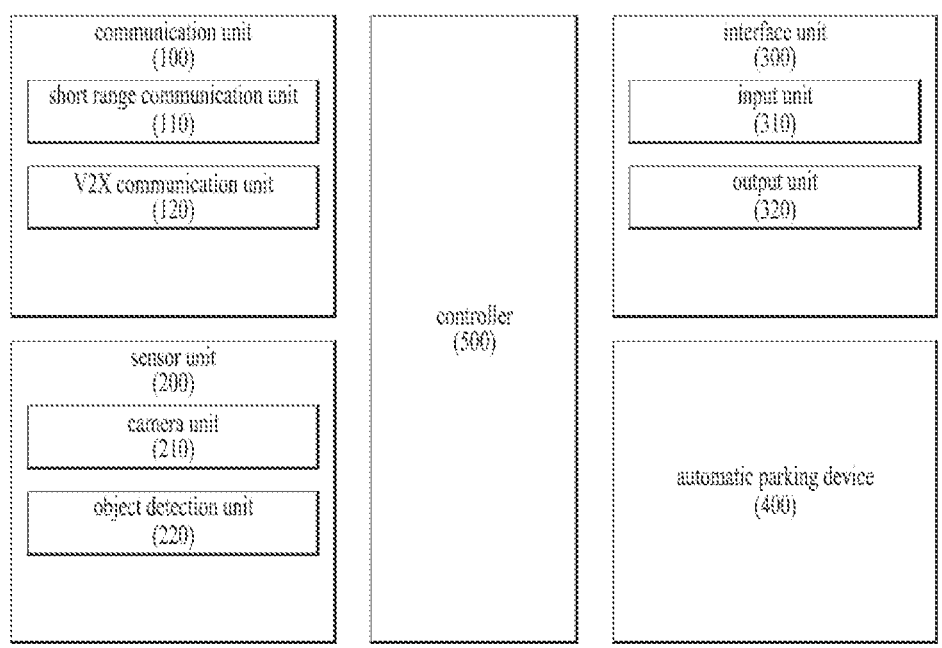
FIG. 1 is a block diagram to describe a configuration of a reference vehicle of a joint parking system according to one embodiment of the present disclosure.

FIG. 1 is a block diagram to describe a configuration of a reference vehicle of a joint parking system according to one embodiment of the present disclosure.

First of all, as shown in FIG. 1, a reference vehicle 1000 of a joint parking system according to the present embodiment may include a communication unit 100, a sensor unit 200, an interface unit 300, an automatic parking device 400, and a controller 500.

The communication unit 100 may include a short-range communication unit 110 and a V2X communication unit 120. Depending on an embodiment, the communication unit 100 may further include other components other than the described components, or may not include some of the described components.

The short-range communication unit 110 is a unit for short range communication. The short range communication unit 110 may support short-range communication using at least one of Bluetooth, Radio Frequency Identification (RFID), Infrared Data Association (IrDA), Ultra Wideband (UWB), ZigBee, Near Field Communication (NFC), and Wireless-Fidelity (Wi-Fi), Wi-Fi Direct, Wireless Universal Serial Bus (Wireless USB), The short-range communication unit 110 may form Wireless Area Networks, thereby performing short range communication between the reference vehicle and at least one vehicle.

The V2X communication unit 120 is a unit for performing Vehicle-to-Infra (V2I) or Vehicle-to-Vehicle (V2V) wireless communication. The V2X communication unit 120 may include communication with infrastructure (V2I) and vehicle-to-vehicle communication (V2V).

In order to identify a target vehicle for joint parking, the communication unit 100 may perform communication for identifying a target vehicle for joint parking among an unspecified number of vehicles.

The communication unit 100 may transmit and receive data between vehicles through V2V communication in an online state. The communication unit 100 may transmit and receive data between vehicles through short range communication in an offline state.

The sensor unit 200 may include a camera unit 210 including a plurality of cameras and an object detection unit 220.

The camera unit 210 may include a front camera that photographs an image in front of the vehicle, a left camera that photographs an image in the left side of the vehicle, a right camera that photographs an image in the right side of the vehicle, and a rear camera that photographs an image in rear of the vehicle. The image in front of the vehicle may be received from the front camera, the image in the left side of the vehicle may be received from the left camera, the image in the right side of the vehicle may be received from the right camera, and the image in rear of the vehicle may be received from the rear camera.

Each of the cameras of the camera unit 210 may include an image sensor and an image processing module. Each of the cameras may process a still image or a moving image obtained by the image sensor (e.g., CMOS or CCD). The image processing module may extract necessary information by processing the still or moving image obtained through the image sensor.

The object detection unit 220 is a means for detecting an object located outside the vehicle. The object may include various things related to the driving of the vehicle. The object detection unit 220 may detect an obstacle around the reference vehicle.

The object detection unit 220 may include a radar, a lidar, an ultrasonic sensor, an infrared sensor, and the like.

The object detection unit 220 may detect and track an object. The object detection unit 220 may process sensing data of each sensor through a data processing algorithm to detect a type of the object, a location or position of the object, a distance from the object, and the like.

The interface unit 300 may include an input unit 310 and an output unit 320.

The input unit 310 is configured to receive information from a user, and data collected from the input unit 310 may be analyzed by the controller 500 and processed as a user's control command.

The output unit 320 may include a display capable of displaying a graphic object corresponding to various kinds of information.

The output unit 320 may include an Audio Video Navigation (AVN). Meanwhile, the display of output unit 320 may include a touchscreen, and such a touchscreen may provide both an input interface and an output interface between the vehicle and the user.

The automatic parking device 400 may perform parking of the vehicle.

The automatic parking device 400 may receive object information from the object detection unit 220 and provide a control signal to a vehicle driving device to perform automatic parking of the vehicle. The automatic parking device 400 may receive a signal from an external device through a communication device and provide a control signal to the vehicle driving device to perform the automatic parking of the vehicle.

The controller 500 may control an operation for a joint parking method based on the information inputted from the communication unit 100, the sensor unit 200, and the interface unit 300.

The controller 500 may select the number of target vehicles joining the joint parking according to a user input.

The controller 500 may generate joint parking information based on the selected number of joint parking vehicles. The joint parking information may include parking arrangement according to the number of identified joint parking vehicles, surrounding obstacle information with referee to the reference vehicle 1000 based on the parking arrangement, and parking position information of the target vehicle.

The controller 500 may configure a parking arrangement according to the number of the identified joint parking vehicles. The controller 500 may configure the parking arrangement in a preconfigured form according to the number of the joint parking vehicles.

For example, when the number of the joint parking vehicles is two in total with the reference vehicle 1000 and one target vehicle, the controller 500 may configure the parking arrangement according to the joint parking in the form of a straight line.

For example, when the number of joint parking vehicles is three in total with the reference vehicle 1000 and two target vehicles, the controller 500 may configure the parking arrangement according to the joint parking in form of a triangle.

For example, when the number of joint parking vehicles is four in total with the reference vehicle 1000 and three target vehicles, the controller 500 may configure the parking arrangement according to the joint parking in form of a quadrangle.

In addition, the controller 500 may directly configure a parking arrangement in form desired by a user in response of a user input.

The controller 500 may transmit the generated joint parking information to the target vehicle of the joint parking through the communication unit 100.

The controller 500 may determine a communication state of a target vehicle participating in the joint parking through the communication unit 100. The communication state may include an online state capable of performing data communication through V2V communication and an offline state capable of performing short range communication between vehicles.

The controller 500 may transmit the joint parking information based on the communication state with the target vehicle.

For example, when the communication state is an online line, the controller 500 may simultaneously transmit the joint parking information generated at the same time to the target vehicle that performs the joint parking.

For example, when the communication state is an offline state and short range communication is capable of one-to-many communication, the controller 500 may simultaneously transmit the joint parking information generated simultaneously to the target vehicle performing the joint parking.

For example, when the communication state is the offline state and the short range communication is capable of one-to-one communication only, the controller 500 may transmit the generated joint parking information to one of target vehicles of the joint parking.

The controller 500 may display the generated joint parking information on the in-vehicle display. The controller 500 may display at least one of an AVM parking guide and a rear camera parking guide on the in-vehicle display.

When the AVM parking guide is outputted on the in-vehicle display, the controller 500 may output a target parking area, a parking target center, a wheel direction guide, an effective parking area and the like in the AVM of the vehicle.

When the rear camera parking guide is outputted on the in-vehicle display, the controller 500 may display a target parking area, a parking target center, a current wheel direction, a wheel direction guide, and a parking effective area in a rear camera image of the vehicle.

The controller 500 may display a parking target vehicle to be parked jointly. The controller 500 may display real-time information indicating that the parking target vehicle included in the joint parking is being parked. The controller 500 may display target vehicle and surrounding obstacle information, a parking position, and parking arrangement information after completion.

For example, if a plurality of vehicles for joint parking are parked sequentially or simultaneously, the possibility of a collision can be prevented by displaying a current status on the in-vehicle display in real time for a parking target vehicle.

The controller 500 may display a position and space of the vehicle according to the joint parking through an AR HUD disposed inside the vehicle. The controller 500 may predict a space according to a size and a parking arrangement of the vehicle and display availability for parking in a remaining space and a post-parking state.

The controller 500 may display the parking arrangement state and its target parking position information through the AR HUD. The controller 500 may transmit parking position information, AVM, rear camera information, and real-time position information to the joint parking target vehicle through the communication unit 100. Accordingly, each of the target vehicles may display the received parking position information, AVM, rear camera information, and real-time position information through the HUD.

The controller 500 may control the parking to be performed based on object detection information detected by the object detection unit 220.

For example, the controller 500 may control the parking to be performed based on the detected object. In this case, the parking target may include a detected object such as a vehicle, a tree, a structure, or the like. The controller 500 may configure an object selected from the detected objects and control the vehicle to be parked around the object.

Figure 2:
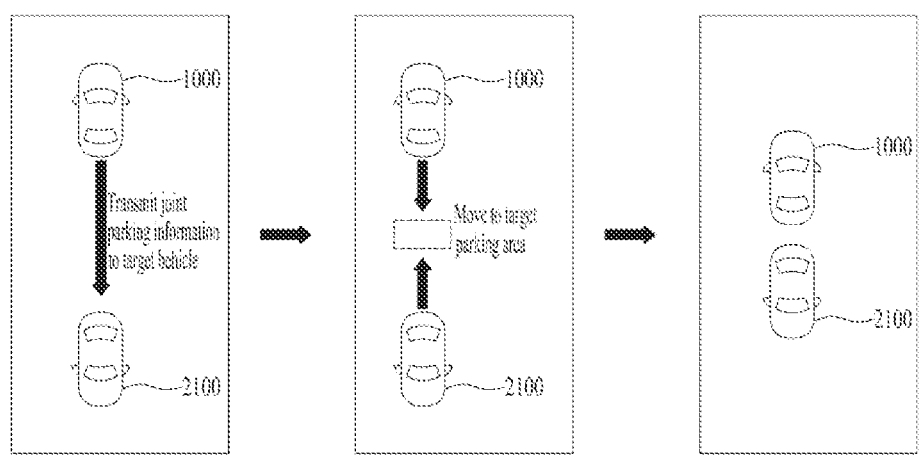
FIG. 2 is a diagram to describe joint parking for two vehicles according to one embodiment of the present disclosure.

FIG. 2 is a diagram to describe joint parking for two vehicles according to one embodiment of the present disclosure.

As shown in FIG. 2, when vehicles performing joint parking include a reference vehicle 1000 and a first target vehicle 2100, they may be parked in parking arrangement in form of a straight line. When the reference vehicle 1000 is parked, the reference vehicle 1000 may activate joint parking in response to an input of a user.

Once the joint parking is activated, the number of joint parking vehicles may be selected by a user input.

The reference vehicle 1000 may transmit joint parking information to the first target vehicle 2100 through wireless communication. The joint parking information may include parking arrangement information selected by the reference vehicle 1000, position information of the reference vehicle 1000, information of a target parking area in which the first target vehicle 2100 will be parked, and obstacle information of obstacles around the target parking area with reference to the reference vehicle 1000. In this case, the parking area information may be configured in consideration of a vehicle size and a passage size through which a pedestrian may pass.

The reference vehicle 1000 and the first target vehicle 2100 may perform parking in the target parking area based on the joint parking information. In this case, when the reference vehicle 1000 and the first target vehicle 2100 are the vehicles for which automatic parking is supported, the automatic parking may be performed based on the joint parking information.

When the reference vehicle 1000 does not support automatic parking, manual parking may be performed. When each vehicle is a vehicle supported by an AVM and a rear camera, the joint parking information may be displayed on an internal display. The reference vehicle 1000 may output a guide to enter the target parking area for the joint parking.

Figure 3:
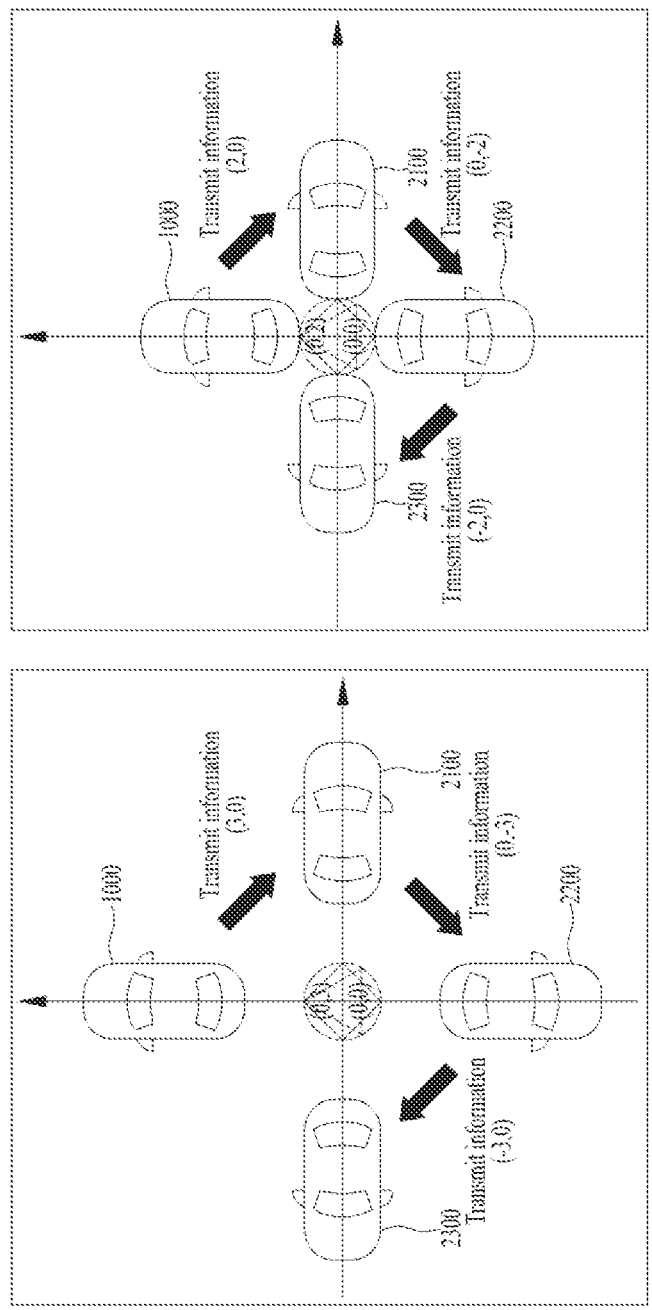
FIG. 3 and FIG. 4 are diagrams to describe joint parking for four vehicles according to one embodiment of the present disclosure.
Figure 4:
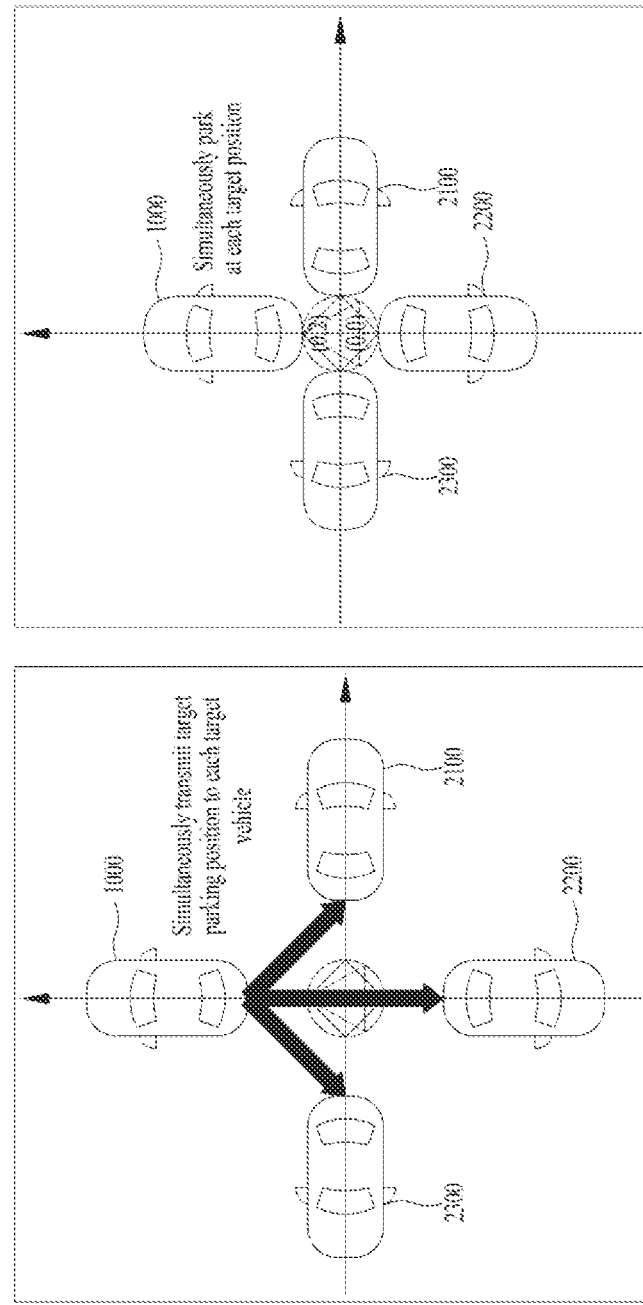

FIG. 3 and FIG. 4 are diagrams to describe joint parking for four vehicles according to one embodiment of the present disclosure.

FIG. 3 illustrates a case in which there are four joint parking vehicles and each vehicle performs joint parking by 1:1 bidirectional communication through short range communication.

Referring to FIG. 3, when there are four vehicles performing joint parking, they may be parked in parking arrangement in form of a rectangle. In this case, when a target parking position for joint parking is selected, a reference vehicle 1000 may consider a target parking position to park in a recommended step for each distance in consideration of a vehicle size and a size of a passage through which a pedestrian may pass.

After parking, the reference vehicle 1000 may transmit joint parking information to one of target vehicles located on the left and right sides. Having received the joint parking information, the target vehicle may be parked in response to the joint parking information and transmit the joint parking information to a nearby target vehicle. The target vehicles of the joint parking may repeat this to complete the parking.

As shown in FIG. 3, when the reference vehicle 1000 is parked at a position (0, 3), it may transmit joint parking information to a first target vehicle 2100 nearby. In this case, the joint parking information may include a parking position (3, 0) of the first target vehicle 2100.

The first target vehicle 2100 may be parked at the position (3, 0) based on the joint parking information. Thereafter, the first target vehicle 2100 may transmit joint parking information to a second target vehicle 2200. In this case, the joint parking information may include a parking position (0, −3) of the second target vehicle 2200.

The second target vehicle 2200 may be parked at the position (0, −3) based on the joint parking information. Thereafter, the second target vehicle 2200 may transmit joint parking information to a third target vehicle 2300. In this case, the joint parking information may include a parking position (−3, 0) of the third target vehicle 2300.

The third target vehicle 2300 may be parked at the position (−3, 0) based on the joint parking information.

Thereafter, the reference vehicle 1000 may change a parking position according to the per-distance recommendation step.

When the reference vehicle 1000 changes the parking position into a position (0, 2), it may transmit joint parking information to the first target vehicle 2100 nearby. In this case, the joint parking information may include the parking position (2, 0) of the first target vehicle 2100.

The first target vehicle 2100 may be parked at the position (2, 0) based on the joint parking information. Thereafter, the first target vehicle 2100 may transmit joint parking information to the second target vehicle 2200. In this case, the joint parking information may include a parking position (0, −2) of the second target vehicle 2200.

The second target vehicle 2200 may be parked at the position (0, −2) based on the joint parking information. Thereafter, the second target vehicle 2200 may transmit joint parking information to the third target vehicle 2200. In this case, the joint parking information may include a parking position (−2, 0) of the third target vehicle 2300.

FIG. 4 shows a case of performing joint parking when there are four joint parking vehicles and each vehicle supports one-to-many communication through online communication or short range communication.

As shown in FIG. 4, after parking, a reference vehicle 1000 may simultaneously transmit joint parking information to first to third target vehicles 2100, 2200, and 2300 performing joint parking. The first to third target vehicles 2100, 2200, and 2300 having received the joint parking information may be simultaneously parked at target parking positions, respectively.

Figure 5:
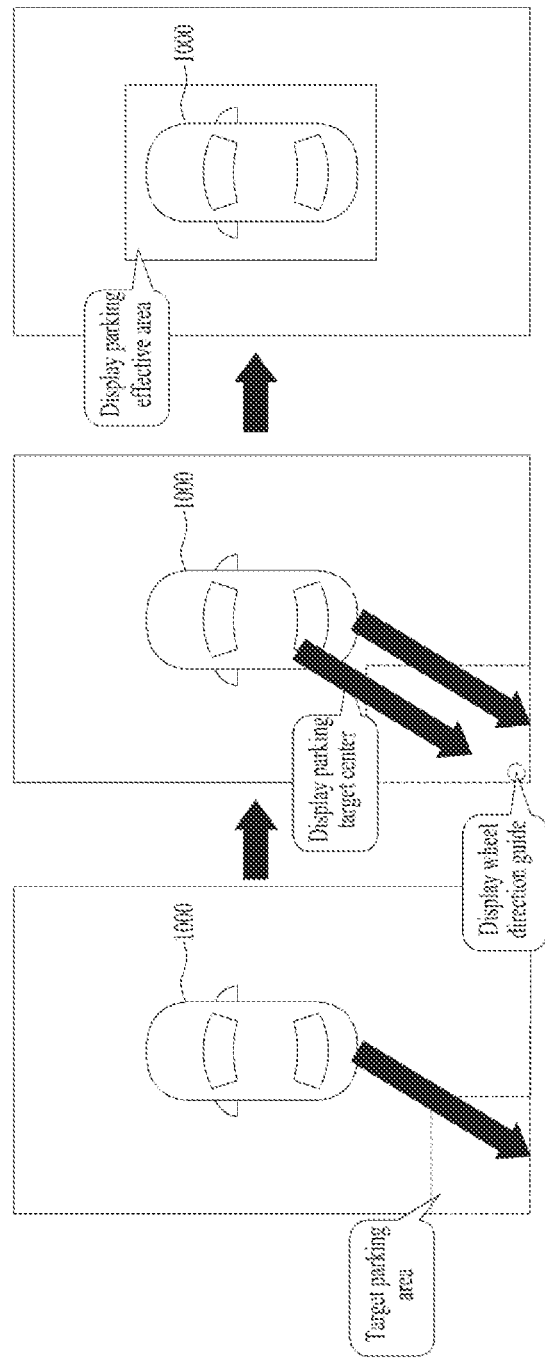
FIG. 5 and FIG. 6 are diagrams to describe a parking guide display method of a vehicle performing joint parking according to one embodiment of the present disclosure.
Figure 6:
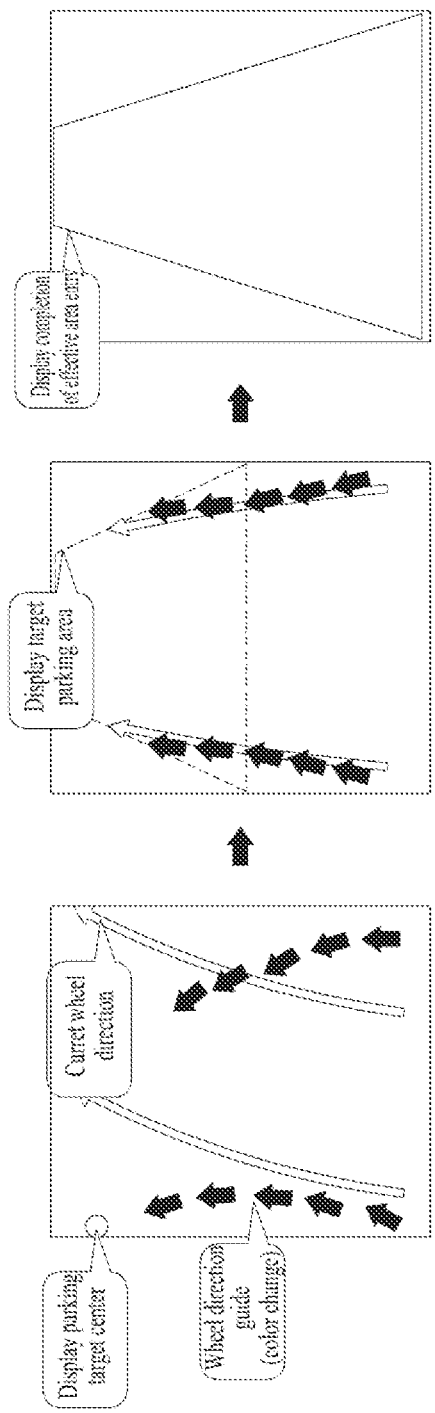

FIG. 5 and FIG. 6 are diagrams to describe a parking guide display method of a vehicle performing joint parking according to one embodiment of the present disclosure.

FIG. 5 illustrates an AVM parking guide in a vehicle that performs joint parking according to an embodiment of the present disclosure. In this case, vehicles performing joint parking may correspond to a reference vehicle and a target vehicle, and an AVM guide will be described based on the reference vehicle 1000.

Referring to FIG. 5, when the reference vehicle 1000 is a vehicle for which automatic parking is not supported, AVM and joint parking information may be displayed on a display in the reference vehicle 1000. The joint parking information may be displayed as an AVM parking guide on the display.

Since the AVM parking guide shows a view centering around a vehicle, if a target parking area is displayed only, a guide for access to the target parking area may be displayed. The guide may be displayed as an arrow indication.

When the reference vehicle 1000 moves and approaches the target parking area, a parking target center may be displayed in the AVM. In addition, a wheel direction guide may be displayed so that the center of the reference vehicle 1000 may move to the parking target center.

When the reference vehicle 1000 moves within a target parking area range, a parking effective area may be displayed. The parking effective area may be displayed in a color and shape different from those of the target parking area.

FIG. 6 is a diagram to describe how to display a rear camera parking guide according to an embodiment of the present disclosure. In this case, vehicles performing joint parking may correspond to a reference vehicle and a target vehicle, and a rear camera guide will be described based on the reference vehicle 1000.

Referring to FIG. 6, when the joint reference vehicle 1000 is a vehicle for which automatic parking is not supported, a rear camera image and joint parking information may be displayed on an in-vehicle display. The joint parking information may be displayed as a rear camera parking guide on the display.

The rear camera parking guide may display a rear area of the vehicle, a final parking position, and a parking direction guide. The guide may be displayed as an arrow indication. The parking direction guide may indicate a direction (line), in which the vehicle will go backward, as a wheel direction guide. The color of the parking direction guide may be changed according to whether a current wheel direction matches the backward direction.

The rear camera parking guide may display a parking area, a parking target center, and a parking direction guide. The parking direction guide may include a current wheel direction and a wheel direction guide.

The parking direction guide may be displayed in a preset color. For example, if the current wheel direction and the direction of the parking direction guide are not the same, the parking direction guide may be displayed in orange color.

The parking area may be displayed in a preset color. For example, when the vehicle is not parked in the target parking area, the parking area may be displayed in yellow.

When the reference vehicle 1000 moves and approaches the target parking area, the rear camera parking guide may display a target parking area, a current wheel direction, and a parking direction guide. When the current wheel direction and the parking direction guide direction are the same due to the movement of the vehicle, the color may be changed to a preset color. For example, when the current wheel direction and the direction of the parking direction guide are the same, the parking direction guide may be displayed in a green color.

When the reference vehicle 1000 moves within a target parking area range, a parking effective area may be displayed. For example, when the reference vehicle 1000 has completed entering the effective area, the parking area may be displayed in green.

Figure 7:
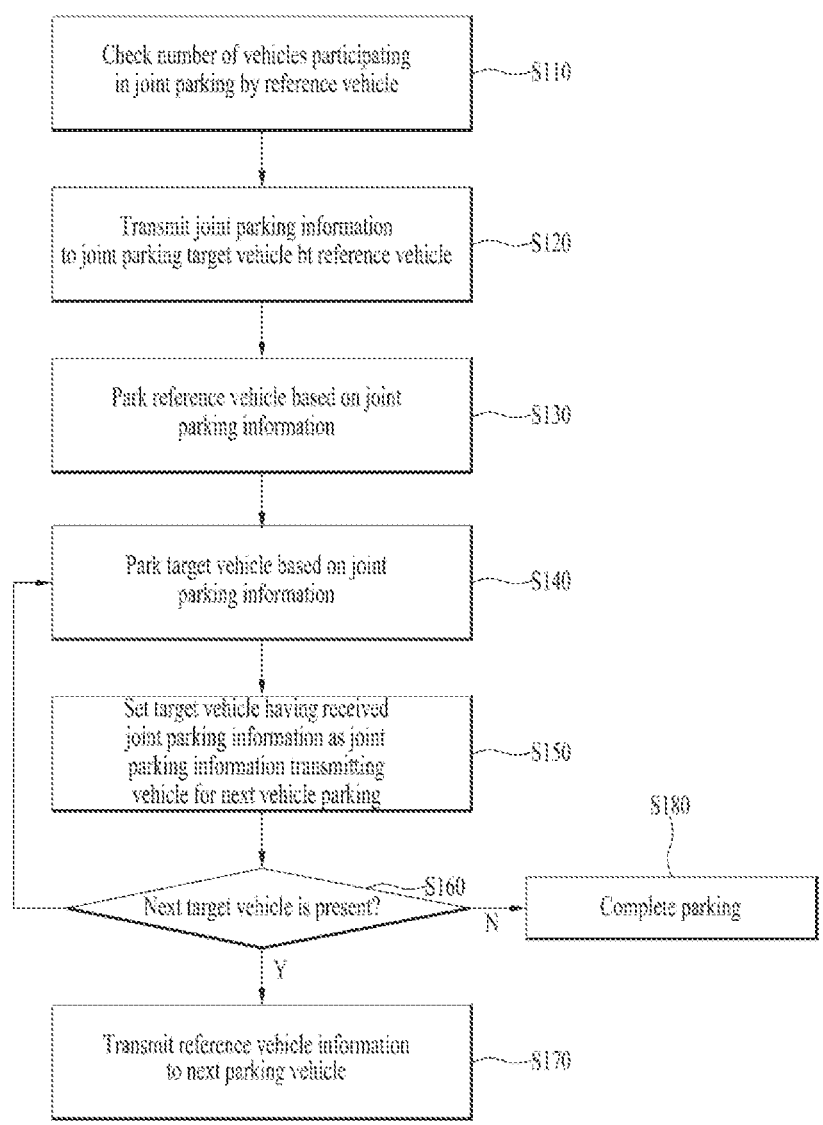
FIG. 7 is a flowchart of a joint parking method by offline short-range communication according to one embodiment of the present disclosure.

FIG. 7 is a flowchart of a joint parking method by offline short-range communication according to one embodiment of the present disclosure.

The reference vehicle 1000 may select the number of vehicles participating in joint parking in response to a user input (S110).

After the step S110, the reference vehicle 1000 may transmit joint parking information to a target vehicle participating in the joint parking (S120). When a communication state with the target vehicle performing the joint parking is an offline state, the reference vehicle 1000 may transmit one-to-one data through short-range communication.

After the step S120, the reference vehicle 1000 may perform parking based on the joint parking information (S130).

After the step S130, the target vehicle may perform parking based on the received joint parking information (S140).

After the step S140, the target vehicle having completed the parking may be set as a joint parking information transmitting vehicle for next vehicle parking (S150).

After the step S150, the target vehicle may determine whether there is a next vehicle to perform the joint parking (S160).

After the step S160, when the next vehicle to perform the joint parking exists, the target vehicle may transmit the joint vehicle information to the next vehicle (S170). Thereafter, the next vehicle may repeat the step S140.

Meanwhile, after the step S160, when there is no next vehicle to perform the joint parking, the joint parking may be completed (S180).

Figure 8:
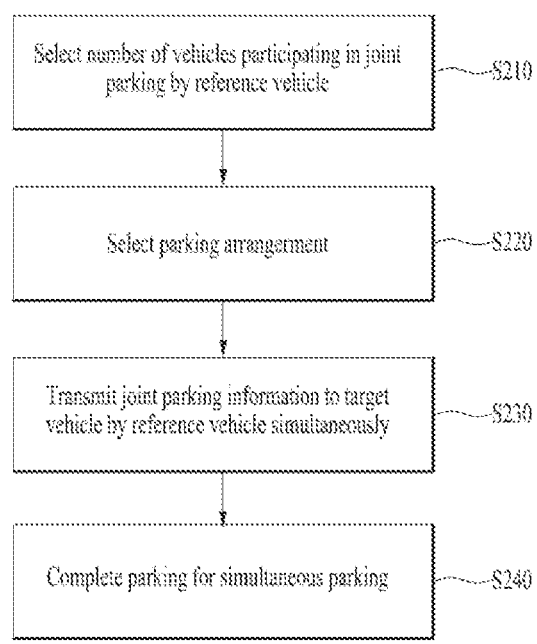
FIG. 8 is a flowchart of a joint parking method by online V2V communication according to one embodiment of the present disclosure.

FIG. 8 is a flowchart of a joint parking method by online V2V communication according to one embodiment of the present disclosure.

The reference vehicle 1000 may select the number of vehicles participating in joint parking in response to a user input (S210).

After the step S210, the reference vehicle 1000 may select a parking arrangement based on the selected number of the vehicles participating in the joint parking. The reference vehicle 1000 may generate joint parking information including the selected parking arrangement (S220).

After the step S220, the reference vehicle 1000 may transmit the joint parking information to a target vehicle participating in the joint parking (S230). When a communication state with the target vehicle performing the joint parking is an online state, the reference vehicle 1000 may simultaneously transmit data to the corresponding vehicle through V2V communication.

After the step S230, the reference vehicle 1000 and the target vehicle may simultaneously perform the parking based on the joint parking information and the joint parking may be completed (S240).

In another aspect of the present disclosure, the above-described proposal or operation of the present disclosure may be provided as codes that may be implemented, embodied or executed by a "computer" (a comprehensive concept including a system on chip (SoC) or a microprocessor), an application storing or containing the codes, a computer-readable storage medium, a computer program product, and the like, which also comes within the scope of the present disclosure.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Therefore, the present disclosure is not intended to be limited to the embodiments shown herein, but to give the broadest scope that matches the principles and novel features disclosed herein.

What is claimed is:

1. A method for performing joint parking, comprising:
    selecting a number of one or more target vehicles participating in the joint parking by a reference vehicle;
    generating joint parking information based on the selected number of the one or more target vehicles;
    transmitting the generated joint parking information to one or more the target vehicles; and
    controlling the joint parking to be performed based on the joint parking information,
    wherein transmitting the generated joint parking information to the one or more target vehicles comprises:
        determining whether a communication state with each of the one or more target vehicles participating in the joint parking is an online state or an offline state; and transmitting, to the one or more target vehicles, the joint parking information in response to determining that the communication state with each of the one or more target vehicles is the online state, and wherein transmitting, to the one or more target vehicles, the joint parking information comprises transmitting the joint parking information simultaneously to the one or more target vehicles through V2V communication.

2. The method of claim 1, wherein generating the joint parking information comprises:
checking a parking arrangement according to the selected number of joint parking vehicles; and
generating the joint parking information including surrounding obstacle information centering on the reference vehicle and parking position information of each of the one or more target vehicles based on the parking arrangement.

3. The method of claim 1, controlling the joint parking to be performed based on the joint parking information comprises displaying the joint parking information on an in-vehicle display by each of the one more target vehicles.

4. A method for performing joint parking, comprising:
selecting a number of one or more target vehicles participating in the joint parking by a reference vehicle;
generating joint parking information based on the selected number of joint parking vehicles;
transmitting the generated joint parking information to the one or more target vehicles; and
controlling joint parking to be performed based on the joint parking information,
wherein controlling joint parking to be performed based on the joint parking information comprises displaying the joint parking information on an in-vehicle display by each of the one more target vehicles, and
wherein displaying the joint parking information on the in-vehicle display by each vehicle in the joint parking comprises displaying at least one of an AVM parking guide and a rear camera parking guide on the in-vehicle display.

5. The method of claim 4, wherein, based on the AVM parking guide displayed on the in-vehicle display, a target parking area, a parking target center, a wheel direction guide, and a parking effective area are displayed within an AVM of each of the one more target vehicles.

6. The method of claim 4, wherein, based on the rear camera parking guide displayed on the in-vehicle display, a target parking area, a parking target center, a current wheel direction, a wheel direction guide, and a parking effective area are displayed within a rear camera image of each of the one more target vehicles.

7. A joint parking system for performing joint parking involving a reference vehicle and one or more target vehicles, the joint parking system comprising:
a communication unit having a short-range communication unit configured to perform short range wireless communication and a V2X communication unit configured to perform V2V communication;
an interface unit having an input unit configured to receive a user input and an output unit including a display; and
a controller configured to perform the joint parking based on information received from the communication unit and the interface unit,
wherein the controller is configured to:
select a number of the one or more target vehicles participating in the joint parking in response to the user input received from the interface unit;
control the reference vehicle to generate joint parking information based on the selected number of the one or more target vehicles;
transmit, through the communication unit, the generated joint parking information to the one or more target vehicles of the joint parking; and
perform the joint parking based on the joint parking information.

8. The joint parking system of claim 7, further comprising an object detection unit configured to detect an obstacle around the reference vehicle,
wherein the controller is configured to check parking arrangement according to the selected number of the one or more target vehicles and generate (1) the joint parking information including surrounding obstacle information centering on the reference vehicle, and (2) parking position information of the one or more target vehicles based on the parking arrangement.

9. The joint parking system of claim 7, wherein the controller is configured to:
determine whether a communication state with each of the one or more target vehicles is an online state or an offline state; and
transmit the joint parking information through the communication unit based on the determined communication state of each target vehicle.

10. The joint parking system of claim 9, wherein;
the one or more target vehicles comprise a plurality of target vehicles, and
the controller is configured to control the communication unit to transmit the joint parking information simultaneously to the plurality of target vehicles through the V2V communication based on the determined communication state of each of the plurality of target vehicles being the online state.

11. The joint parking system of claim 9, wherein:
the one or more target vehicles comprise a plurality of target vehicles, and
the controller is configured to control the communication unit to transmit the joint parking information to each of the plurality of target vehicles through the short-range communication on a one-to-one basis based on the determined communication state of each of the plurality of target vehicles being the offline state.

12. The joint parking system of claim 7, wherein the controller is configured to control the joint parking information to be displayed on an in-vehicle display by each of the one or more target vehicles.

13. The joint parking system of claim 12, wherein the controller is configured to control at least one of an AVM parking guide or a rear camera parking guide to be displayed on the in-vehicle display.

14. The joint parking system of claim 13, wherein, based on the AVM parking guide displayed on the in-vehicle display, the controller is configured to control a target parking area, a parking target center, a wheel direction guide, and a parking effective area to be displayed within an AVM of each of the one more target vehicles.

15. The joint parking system of claim 13, wherein, based on the rear camera parking guide displayed on the in-vehicle display, the controller is configured to control a target parking area, a parking target center, a current wheel direction, a wheel direction guide, and a parking effective area to be displayed within a rear camera image of each of the one more target vehicles.

16. A vehicle comprising:
- a communication unit configured to provide short-range communication or V2V communication for joint parking;
- an automatic parking device configured to perform automatic parking of the vehicle by providing a control signal to a vehicle driving device; and
- a joint parking system configured to:
  - select a number of one or more target vehicles participating in the joint parking in response to a user input;
  - generate joint parking information based on the selected number of the one or more target vehicles;
  - transmit the generated joint parking information to the one or more target vehicles through the communication unit; and
  - perform the joint parking based on the joint parking information,
- wherein, to transmit the generated joint parking information to the one or more target vehicles, the controller is configured to:
  - determine whether a communication state with each of the one or more target vehicles participating in the joint parking is an online state or an offline state; and
  - transmit, to the one or more target vehicles, the joint parking information in response to determining that the communication state with each of the one or more target vehicles is the online state, and
- wherein, to transmit the joint parking information to the one or more target vehicles, the controller is configured to transmit the joint parking information simultaneously to the one or more target vehicles through V2V communication.

* * * * *